United States Patent

[11] 3,594,093

| | | | | | |
|---|---|---|---|---|---|
| [72] | Inventor | Nick Lukacs<br>Adamsburg, Pa. | 3,332,605 | 7/1965 | Huesgen.......................... 415/17 |
| [21] | Appl. No. | 846,567 | 3,441,200 | 4/1969 | Huesgen.......................... 230/5 |
| [22] | Filed | July 31, 1969 | | | |
| [45] | Patented | July 20, 1971 | | | |
| [73] | Assignee | Carrier Corporation<br>Syracuse, N.Y. | | | |

*Primary Examiner*—Leonard H. Gerin
*Attorneys*—Harry G. Martin, Jr. and J. Raymond Curtin

[54] OPERATION OF GAS COMPRESSION APPARATUS
4 Claims, 1 Drawing Fig.

[52] U.S. Cl............................................ 415/15,
417/282, 417/292, 417/307

[51] Int. Cl......................................F01b 25/00,
F04b 49/00

[50] Field of Search............................. 415/15, 17;
230/114, 9, 7, 5; 417/17, 18, 282, 292, 307

[56] References Cited
UNITED STATES PATENTS
3,097,488   7/1963   Eggenberger et al. ........   415/15

ABSTRACT: A control system for regulating operation of a gas compression apparatus, selectively operable on either base mode or on intermittent mode. The control system includes a solenoid valve having a first operating position and having a second operating position. The solenoid valve, when in its first operating position, is operable to transmit a predetermined control signal operable to position an inlet valve regulating flow of gas to the compressor at approximately 30 percent of its fully open position and in its second operating position, is operable to transmit a varying control signal, operable to modulate the inlet valve at any operating position, depending upon the temperature and pressure characteristics of the gas entering the compression plant.

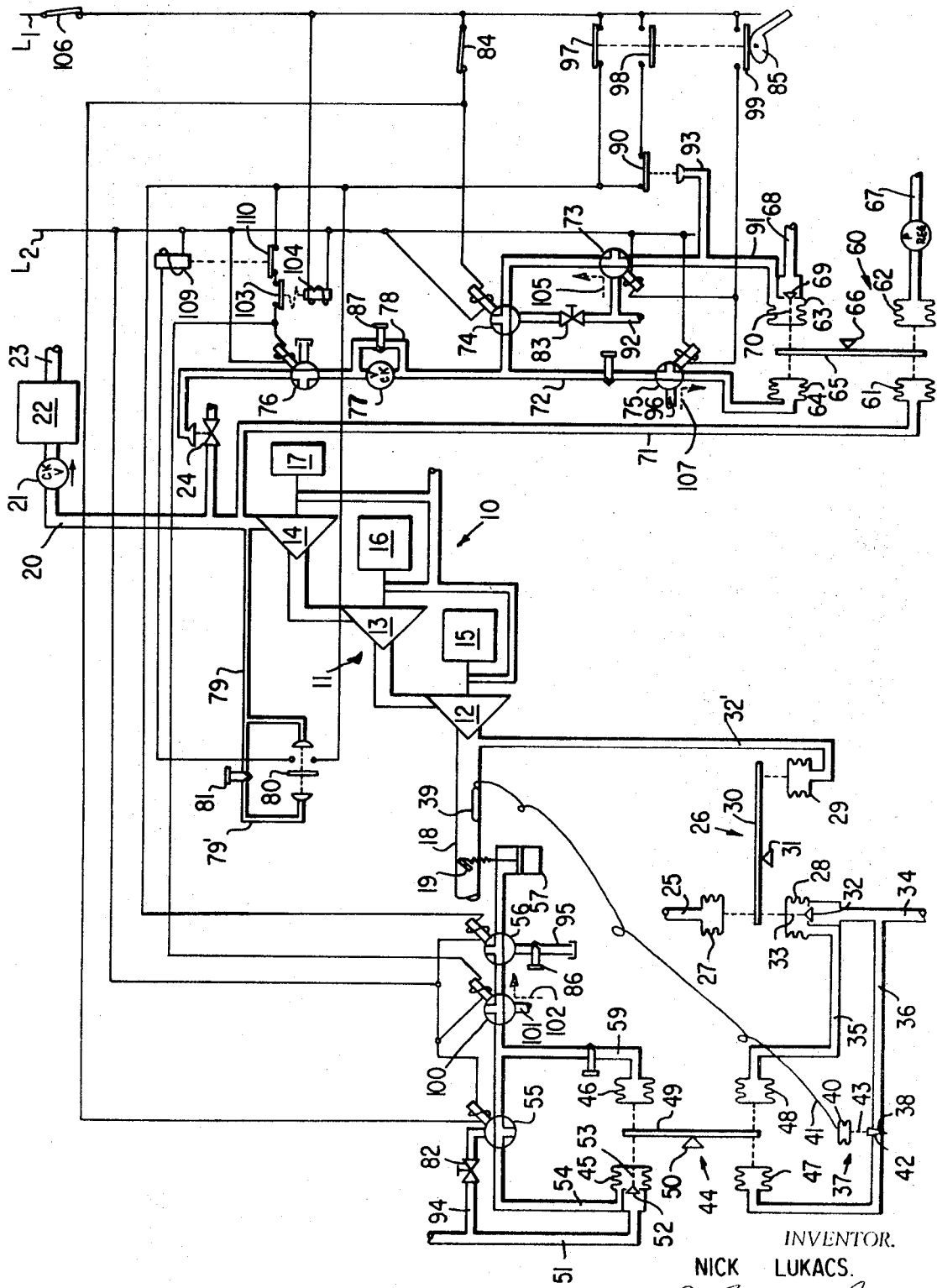

3,594,093

OPERATION OF GAS COMPRESSION APPARATUS

BACKGROUND OF THE INVENTION

This invention relates broadly to the control of the operation of gas compression apparatus and more particularly to gas compression apparatus of the type employing a multistage axial or centrifugal compressor driven by a prime mover. Still more particularly this invention relates to a control arrangement for use with gas compression apparatus selectively operable either as a baseload machine or as an intermittent load machine.

In gas compression equipment, such as an air compression plant employing a number of air compressors or air compression stages, wherein ambient air is compressed and delivered to a reservoir, for use at a variable rate, there are two general types of operation involved. The first type of operation is called baseload operation. The compressor is controlled so as to deliver an output of compressed gas substantially consistent with a demand, variable within predetermined limits. As the plant's compressed gas requirements decrease, an unloading valve disposed in communication with the discharge conduit of the compressor will operate to vent the excess capacity to the atmosphere. The unloading valve will be modulated to maintain the desired discharge pressure.

The second type of operation is called intermittent load operation. When operating on intermittent load, a compressor will either be delivering full capacity to the plant, with the unloading valve completely closed, or will not be delivering any compressed gas to the plant, with the unloading valve completely open. With intermittent mode operation, there is no modulating the unloading valve, as done when operating on base mode.

Although the unloading valve is regulated differently, depending upon the mode of operation being used, an inlet throttle valve, positioned to control the flow of gas entering the compression apparatus, is regulated in the same manner, regardless of the mode of control.

During normal operation of the gas compression apparatus, a relay device receives a first control signal, the magnitude thereof being dependent upon the pressure of the gas entering the compression apparatus, and a second control signal, the magnitude thereof being dependent upon the temperature of the entering gas. The relay device compares the two signals and transmits a resultant control signal to a mechanism, operable to position the inlet valve in accordance with the magnitude of the resultant signal. The inlet valve will operate in a range of from 45 percent of fully open position to its fully open position during normal operations.

However, during startup or when the machine has surged, it is not desirable to regulate the inlet valve in the manner heretofore discussed, for reasons to be explained hereinafter.

When the compressor is being started, air must be supplied to the shaft seals, either from remote equipment or by the machine itself. The machine is therefore brought up to normal operating speeds as fast as possible to obtain the desired air for sealing purposes. If the inlet valve were to be regulated in the same manner as effected during normal operation, the relatively large load thus placed on the machine during startup might prevent the machine from coming up to normal speeds in a short time, thereby causing overload safety devices to prevent the machine from operating.

In addition to pressurizing the seals, a positive gas flow through the machine is required during the startup procedure to prevent problems from occurring. If the machine were brought up to speed without sufficient air flow therethrough, a vacuum thus produced would induce lubricating oil from the lubricant flow circuit into the air passages, thus providing a potential fire or explosive hazard. Secondly, a positive force is required to be maintained on the machine to keep the gears from becoming subjected to severe "backlash" by a shifting of the shafts attached to the gears, an occurrence that is more pronounced at high speed, no load conditions. Finally, without a positive flow of gas, a reverse flow of air through the machine might occur. Such a reversal of flow is called surge and is highly undesirable, for if it occurs for any length of time, the compressor might be seriously damaged.

As noted hereinbefore, it is also desirable to throttle the inlet valve after the machine has surged and is unloaded. When a machine operating at normal conditions surges, the surge indicates a potential source of trouble. A safety circuit is provided to maintain the machine in an unloaded state until the potential source of trouble is located or the operator manually resets the machine.

With the machine operating in the unloaded state at such times, it is desirable to reduce the inlet load on the machine to reduce operating costs, yet maintain a sufficient load on the machine so as to be able to eliminate the surge. For these reasons, it is desirable to throttle the inlet valve as indicated above.

Although it is essential for a control signal of the required magnitude to be transmitted to the positioning mechanism during the conditions mentioned above, too often an operator would fail to regulate the mechanisms as required to obtain the necessary control signal and the problems discussed above would occur.

The object of this invention is a control circuit designed to eliminate a chance of human error. The invention affords means operable to transmit a predetermined control signal of the required magnitude to the inlet valve positioning mechanism, when operating conditions require such signal.

SUMMARY OF THE INVENTION

In accordance with a preferred embodiment of this invention, a gas compression machine is provided which employs an air compressor having a suitable main control circuit operable to achieve the desiderata hereinbefore discussed.

The control circuit includes a solenoid valve having a first operating position and having a second operating position. The valve is operable in its first position to direct a control signal of a predetermined magnitude to means operable to position the inlet valve regulating flow of gas to the compressor to approximately 30 percent of fully open position. Although it is preferable to open the valve to 30 percent of fully open, it has been found that the valve may be opened in the range of 20—35 percent, depending upon the size, operating characteristics, and application of the compressor, and still one may obtain the results desired.

The valve is operable in its second position to direct a control signal of varying magnitude, depending upon the temperature and pressure characteristics of the ambient air entering the compressor, to the means operating to position the inlet valve.

The solenoid valve is responsive to means operable to energize the compressor, said means including a time-delayed closing, normally open switch. As noted before, the compressor is brought up to normal operating speed as fast as possible. While the normally open switch is open, the solenoid valve is in its first operating position and the predetermined control signal is transmitted to the inlet valve positioning means. When the switch closes after the unit is up to speed, the variable control signal is transmitted to the positioning means.

In addition to being responsive to the compressor energizing means, the solenoid valve is also responsive to surge detecting means. When surge is detected, means are actuated to place the compressor in an unloaded operating condition. In addition, the surge detecting means actuates switch means operable to place the solenoid valve in its first operating position, thereby transmitting the predetermined control signal to the inlet valve positioning means.

It is thus apparent the novel control circuit is operable to automatically transmit a predetermined control signal when required, such as during startup or when the compressor is placed in an unloaded condition due to surge, and then automatically operates to transmit a variable control signal, the magnitude thereof being determined by the temperature and pressure characteristics of the ambient inlet air, during normal operation of the compression plant.

BRIEF DESCRIPTION OF THE DRAWING

The FIGURE of the drawing illustrates a gas compression system having a control circuit in accordance with this invention.

DESCRIPTION OF THE PREFERRED EMBODIMENT

Referring to the FIGURE of the drawing, there is shown a gas compression system operating on base mode. It is to be understood the novel control circuit may be also utilized with compression systems operating on intermittent mode.

The gas compression system 10 includes an air compressor 11 for the purpose of providing compressed air to a storage vessel or reservoir for use with pneumatic machinery or similar applications where compressed air is utilized as an energy source. It will be appreciated there are many installations requiring compressed air in such large quantities that it is necessary to supply an air compression plant utilizing a multistage axial or centrifugal compressor 11. The compressor 11 has a first stage 12 in series with a second stage 13 and a third stage 14. For the purpose of illustrating a representative machine, each of the stages are connected to a prime mover 15, 16, and 17 respectively. It should be understood that one prime mover may be used to operate all of the stages of the compressor.

Inlet line 18 is provided to admit ambient air through an inlet throttle valve 19 to first stage 12 of compressor 11. Compressed air is discharged from compressor 11 through a check valve 21 in gas discharge conduit 20 into storage tank or reservoir 22. A suitable compressed air discharge line 23 distributes air from the reservoir 22 to the desired locations at which it is employed.

In order to maintain the pressure of discharge air in reservoir 22 in line 23 relatively constant at a predetermined pressure, a dump valve 24 is employed to discharge compressed air from compressor 11 to the atmosphere when the pressure demands of the reservoir 22 are satisfied. Dump valve 24 may be operated either at a fully open position or at a fully closed position, or it may be modulated, according to the characteristics of the mode of operation employed. As noted above, the air compression system of the preferred embodiment is operating on base mode; therefore the dump valve 24 may be modulated to maintain the desired pressure in reservoir 22.

The control system serving as the subject of this invention is utilized with equipment of the kind described above. To fully understand the operation of the novel control system, it is necessary to understand the operation of the system during normal operation in one of its modes of control.

Again referring to the FIGURE, the embodiment of the invention utilizes an electropneumatic control system. However, it should be understood the scope of the invention shall not be limited to only an electropneumatic control system, but includes an all-pneumatic system. Therefore, hereinafter, when electrically operated valves are specified, they may be replaced by their equivalent pneumatically operated valves without departing from the scope of the invention. A source (not shown) of supply air, in the range of 45—125 p.s.i.g., is employed to operate certain elements forming a part of the control system. It is to be understood the supply or control air is maintained completely separate from the air being compressed by the compressor 11. A plurality of electrically operated valves are utilized to direct pneumatic control signals in predetermined paths, depending in part upon system conditions and in part upon the mode of operation being used. A detailed explanation of the control system may be found in U.S. Pat. No. 3,332,605 issued on July 25, 1967, to Eugene L. Huesgen. The control system is designed, among other things, to regulate the operation of throttle valve 19, controlling the flow of air to the compressor, and the dump valve 24, regulating the venting of the compressor discharge to the atmosphere.

To this end, there is provided a main air supply conduit (not shown) having a first supply branch 25. Disposed in supply branch 25 is a control assembly 26 including bellows members 27, 28, and 29 and beam member 30, pivotally mounted about fulcrum 31. Connected to bellows 29 is conduit 32', communicating bellows 29 with inlet line 18, thereby making the bellows responsive to inlet air pressure. The inlet pressure, which is normally below atmospheric pressure due to the throttling action of the inlet valve 19, produces a force which tends to pivot beam 30 in a clockwise direction about fulcrum 31.

Acting to limit the force produced by the inlet air pressure is the positive force produced by supply air in supply branch 25 acting on bellows 27, tending to rotate beam 30 counterclockwise about fulcrum 31. Secured to bellows 28 is a valve assembly, including valve element 32 and rod 33. Communicating with bellows 28 is second supply branch 34. When the air inlet pressure exceeds a predetermined point, the counterclockwise motion of beam 30 thus produced, unseats valve element 32, thereby communicating supply branch 34 with conduit 35. Valve element 32 thus controls the pressure in conduit 35.

Communicating with supply branch 34 is branch conduit 36. Disposed in branch conduit 36 is a control assembly 37 regulating airflow through orifice 38 disposed in conduit 36. The control 37 acts responsive to changes in the temperature of the air flowing within line 18. A bulb 39 senses the temperature of the air flowing in conduit 18 and is part of a thermal responsive fill system incorporating a bellows 40 and a capillary tube 41, providing communication between the bulb 39 and the bellows 40. Secured to the bellows 40 is control assembly 37, including valve element 42 and rod 43 connected to bellows 40, which moves to enlarge or restrict the effective area of the orifice 38 so as to bleed varying amounts of air from conduit 36, to change the pressure in the conduit downstream of the orifice. Valve element 42 is designed to open upon an increase in ambient air temperature and to close upon a decrease in ambient air temperature.

Communicating with conduit 36, downstream of orifice 38, is bellows member 47 of totalizer relay assembly 44. In addition to bellows 47, relay assembly 44 includes bellows members 45, 46, and 48 and beam member 49 pivotally mounted about fulcrum 50. The force developed by the control air in conduit 36 acting on bellows 47, acts to pivot beam 49 counterclockwise about fulcrum 50. Bellows 48 is in communication with conduit 35. The force developed by the control air in conduit 35 acting on bellows 48 acts to pivot beam 49 clockwise about fulcrum 50 and therefore opposes the force developed by bellows 47.

Secured to bellows 45 is a valve assembly, including valve element 52 and rod 53. The valve 52 is designed to close when beam 49 moves clockwise and to open when beam 49 moves counterclockwise. Valve 52 regulates the amount of air that will pass from third supply branch 51 to conduit 54. The air passing through conduit 54 acts as a control signal for positioning throttle valve 19 during normal operation of the system 10 in a manner to be explained more fully hereinafter. Assuming ambient temperature remains constant, if inlet air pressure were to exceed a predetermined amount, the increase in the air in conduit 35, acting on bellows 48, will act to close valve 52 and decrease the control signal through conduit 54. If inlet air pressure were to remain constant, but the ambient air temperature were to increase, the resulting increase in air pressure downstream of orifice 38, acting on bellows 47, would cause valve 52 to be opened, thereby increasing the control signal in conduit 54. If inlet air pressure and ambient air temperature both were to change, totalizer relay assembly 44 would compare the changes, as indicated by the changes in pressure in conduits 35 and 36, and would thereby determine the resulting control signal in conduit 54.

The control signal passes through electrically operated three-way valves 55, 56, and 100 and is then transmitted to inlet throttle valve positioner assembly 57. The manner in which valves 55, 56, and 100 are controlled will be more fully explained hereinafter. Valves 55, 56, and 100 are shown in their energized positions. An increase in the control signal acts to open the inlet valve 19 and a decrease in the control signal acts to close the inlet valve 19. During normal operation, the inlet valve will be either fully open, fully closed, or may be modulated to any intermediate position therebetween, the position of the valve being determined by the pressure and temperature conditions of the air entering the compressor. The normal operating range for the inlet valve 19 is from 45 percent of fully open to 100 percent of fully open.

To prevent hunting, conduit 59 communicates conduit 54 with bellows 46, thereby placing the bellows under control signal pressure. The force developed on bellows 46 acts to resist any change in position of the beam 49 and thus of the valve element 52.

An additional feature of the control system involves an arrangement for modulating the dump valve 24 when on base mode of control and either fully opening or fully closing the valve 24 when on intermittent mode of control.

To this end, a second totalizer relay assembly 60 is used in obtaining the control of the dump valve 24 as desired. Relay assembly 60 includes bellows members 61, 62, 63, and 64 and beam member 65 pivotally mounted about fulcrum 66. Communicating air discharge conduit 20 and bellows member 61 is conduit 71; thereby bellows member 61 has air at discharge pressure acting on it. The force developed thereby acts to rotate beam 65 counterclockwise about fulcrum 66.

Bellows member 62 is in communication with a fifth supply branch 67 which delivers a predetermined control signal to the bellows, thereby producing a force in opposition to the force of bellows member 61. Secured to bellows 63 is a valve assembly, including valve member 69 and rod 70. The valve assembly is designed so valve member 69 closes when beam 65 rotates counterclockwise and opens when beam 65 rotates clockwise. The valve assembly controls the bleeding of supply air from conduit 68 to conduit 91. A greater amount of control air will exist in conduit 91 when the discharge pressure is low, and a lesser amount of air will exist in conduit 91 when the discharge pressure is high.

The air in conduit 91 flows through electrically operated three-way valves 73 and 74 into conduit 72. The manner in which valves 73 and 74 are controlled shall be discussed more fully hereinafter. Valve 73 is shown in its deenergized position and valve 74 is shown in its energized position. Conduit 72 transmits the control signal to dump valve 24. Disposed in the conduit 72 upstream of dump valve 24 is check valve 77. Check valve 77 is designed to prevent flow in the direction of the dump valve. The control signal is bypassed around check valve 77 via conduit 78. Needle valve 87 disposed in conduit 78 restricts the flow of air towards the dump valve for a reason to be explained hereinafter. Disposed in conduit 72, downstream of check valve 77 and bypass 78, is electrically operated three-way valve 76. The manner of control of valve 76 will be explained later. Valve 76 is shown in its energized position.

To prevent hunting, conduit 72 communicates with bellows 64 via electrically operated three-way valve 75. During base mode of operation, valve 75 is in its deenergized position. The force developed on bellows 64 acts to resist any change in position of beam 66 and thus of valve element 69.

Dump valve 24 is designed to be fully open when no control signal is transmitted to it and to be fully closed when the maximum control signal, in the preferred embodiment 32 p.s.i.g., is transmitted. As noted heretofore, during baseload operation, the dump valve may be operated at a fully open or at a fully closed position, or may be modulated to maintain a relatively constant discharge pressure. During intermittent mode operation, the valve 24 will either be fully open or fully closed.

To protect the compressor during surge conditions, the control system includes pressure operated, normally open switch 80. Switch 80 operates to detect surge conditions and is designed to close upon a predetermined pressure differential being reached. Switch 80 senses discharge air via conduit 79 communicating with conduit 20. If surge occurs, the pressure in conduit 79 will decrease rapidly during each cycle of reverse flow of air through the compressor. However, needle valve 81 disposed in the lower portion of conduit 79 will restrict the flow of air from conduit portion 79' during the cycle of reverse flow of air, thereby creating a pressure differential and causing switch 80 to close. The closing of switch 80 will cause the dump valve 24 to open immediately. In addition, switch 80 functions to partially control the operation of the invention herein. The manner in which switch 80 causes the above to occur shall be explained hereinafter.

When operating automatically, and in base mode, the electrical circuit will be positioned as shown in the FIGURE. Mode-of-operation switch 85 will be positioned for base mode operation, thereby closing switch 97 and opening switches 98 and 99. Selector switch 84, when set for automatic operation as shown, connects three-way valves 55 and 74 to a source of current (not shown) through lines $L_1$ and $L_2$. If it were desired to operate the control system manually, switch 84 would be placed in its manual position, and three-way valves 55 and 74 would then be deenergized. With valve 55 deenergized, the control signal transmitted from relay 44 would be blocked. In place thereof, the valve 55 would then be positioned to communicate supply branch 94 with conduit 54. The control signal to the inlet valve positioner 57 may then be manually regulated via valve 82. Similarly, with valve 74 deenergized, the control signal transmitted from relay 60 would be blocked. The deenergized position of valve 74 communicates supply branch 92 with conduit 72. The control signal to dump valve 24 may then be manually regulated by operating valve 83 disposed in branch 92.

The manner of operation of the compression system 10 and the control circuit therefor, when on intermittent mode, is more fully explained in copending application Ser. No. 846,491, entitled "Method and Apparatus for Controlling the Operation of Gas Compression Apparatus," filed July 31, 1969, Nick Lukacs, inventor. However, a brief summary of the operation of the system during intermittent mode shall follow.

When it is desired to operate on intermittent mode, switch 85 is properly positioned. Switches 98 and 99 are then closed and switch 97 is opened. With valve 73 thereby in its energized position, the full control signal from relay 60 is directed to pressure actuated switch 90 via conduit 93. Switch 90 is designed to close when the discharge pressure falls below a predetermined point and to open when the discharge pressure reaches the predetermined point through the action of relay 60. Switch 90 is connected in series with valves 56 and 76. When switch 90 opens, valves 56 and 76 are deenergized and the machine is operating in its unloaded position. When switch 90 closes, the valves are energized and the machine is delivering compressed air to the system. As noted before, dump valve 24 is either fully open or fully closed during intermittent mode operation. The control signal regulating the operation of valve 24 is of a predetermined magnitude. The control signal is supplied via conduit 92 to conduit 91 downstream of valve 73. The path of flow of the control signal is shown by dotted arrow 105.

Valve 75 is also energized when on intermittent mode operation. A predetermined control signal is thus delivered to bellows 64 via conduit 96. The path of flow of the control signal to bellows 64 is shown by dotted arrow 107.

Assume the compressor 11 is not operating and it is desired to energize the compressor. Main switch 106 is placed in its "on" position, thereby supplying power to the prime movers 15, 16, and 17. The manner in which the prime mover may be connected to switch 106 is not shown, but is considered to be within the ordinary skill of the art.

As noted hereinbefore, since the compressor is designed to operate at relatively high speeds, it is necessary to bring the compressor up to speed as fast as possible without placing a normal operating load on the compressor immediately upon startup. However, as also noted above, during this unloaded startup period it is desirable to open inlet valve 19 to approximately 30 percent of its fully open position to avoid the problems heretofore discussed.

To obtain the desired results, valve 56 is immediately energized when switch 106 is positioned on "on."

Connected in series with valves 76 and 100 is normally open switch 103. Switch 103 is a time-delayed closing switch and is controlled by relay 104. Switch 103 is designed to close after the compressor has reached normal operating speed.

Until switch 103 closes, valves 76 and 100 are in their deenergized positions. With valve 76 deenergized, dump valve 24 is fully open.

With valve 100 deenergized, the control signal from relay 44 cannot be transmitted to inlet valve positioner 57. Instead, a predetermined control signal is transmitted via conduit 101 to the valve positioner 57. Dotted arrow 102 indicates the flow path of the control signal when valve 100 is deenergized. In a preferred embodiment, the signal is 10 p.s.i.g. and is of sufficient magnitude to open the inlet valve to approximately 30 percent of its fully opened position as desired. However, it is within the scope of the invention for the predetermined signal to operate to open the inlet valve in the range of from 20—35 percent of its fully open position.

When the compressor reaches normal operating speed, switch 103 closes, thereby energizing valves 76 and 100, the operation of the compressor then proceeding as previously discussed with relays 44 and 60 governing the regulation of the operation. The startup sequence is the same, whether operating on intermittent mode or on base mode.

Now assume the compression apparatus 10 is operating normally, delivering compressed air to reservoir 22. If surge conditions were to suddenly occur, switch 80 would close. When switch 80 closes, energy is supplied to relay 109. Connected to relay 109 is normally closed switch 110. Switch 110 is in series with valves 76 and 100. The opening of switch 110 deenergizes valves 76 and 100. Deenergization of valve 100 causes conduit 101 to be communicated with the inlet valve positioner 57, thereby placing the inlet valve 19 in its 30 percent of fully open position. For the reasons discussed heretofore, the compression apparatus is maintained in this manner until the operator manually resets the controls and thus takes the plant out of its unloaded surge-detected operation.

It is thus readily apparent the novel control circuit operates to automatically position the inlet valve to maintain the required minimum air flow through the compressor during the startup sequence and during the surge-detected unloaded mode and is additionally operable to automatically transfer the manner in which the inlet valve 19 is controlled once normal operating conditions are obtained.

While I have described and illustrated a preferred embodiment of my invention, it will be understood that the invention may be otherwise embodied within the scope of the following claims.

I claim:

1. A control system for regulating the operation of a gas compression plant, selectively operable on either base mode or intermittent mode, including a motor-driven gas compressor, an inlet conduit, valve means governing flow of gas through the inlet conduit to the compressor, means for storage of gas delivered by the compressor, discharge means connecting the compressor and the storage means, and dump valve means for venting the discharge of the compressor to the atmosphere comprising:
    A. means operable to energize said compressor motor;
    B. means for regulating said valve means governing flow of gas to said compressor including valve means operable in response to said compressor energizing means, having a first operating position and having a second operating position, said valve means being operable in said first position to direct a first control signal of a predetermined magnitude to said regulating means and being operable in said second position to direct a second control signal of a varying magnitude to said regulating means; and
    C. control means operable to place said valve means in said second operating position from said first operating position after a predetermined time interval has elapsed subsequent to energization of said compressor motor.

2. A control system as described in claim 1 wherein said predetermined control signal is operable to place said valve means governing flow of gas to said compressor at 20 percent to 35 percent of its fully open position.

3. A control system as described in claim 1 wherein said multiposition means is placed in said first operating position in response to the actuation of surge detecting means.

4. The method of regulating the operation of a motor-driven gas compressor, selectively operable on either base mode or intermittent mode, having an inlet conduit through which gas to be compressed is supplied to the compressor, an inlet valve in the conduit controlling the flow of gas to the compressor, compressed gas storage means, a discharge conduit connecting the outlet of the compressor with said storage means, dump valve means arranged between said compressor outlet and said storage means for selectively communicating the compressor outlet with the atmosphere to relieve pressure at the discharge side of said compressor, comprising the steps of:
    A. energizing said compressor motor;
    B. operating valve means in a control circuit in response to said energization of said compressor motor, said valve means having a first operating position and having a second operating position;
    C. transmitting a control signal from said valve means to said inlet valve positioning means, said control signal being of a predetermined magnitude when said valve means is in said first operating position and being of a varying magnitude when said valve means is in said second operating position; and
    D. transferring the valve means from said first operating position to said second operating position when a predetermined time interval has elapsed subsequent to energization of said compressor motor.